Oct. 16, 1951    J. R. WATT    2,571,506
INCREMENTAL FREEZING
Filed March 22, 1946
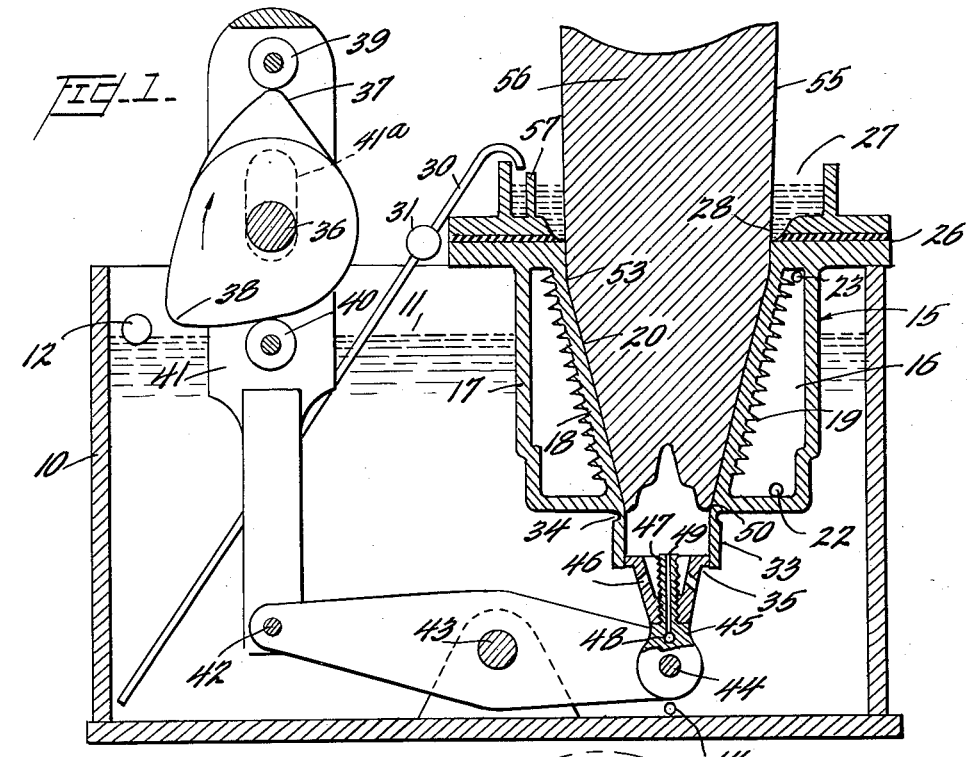
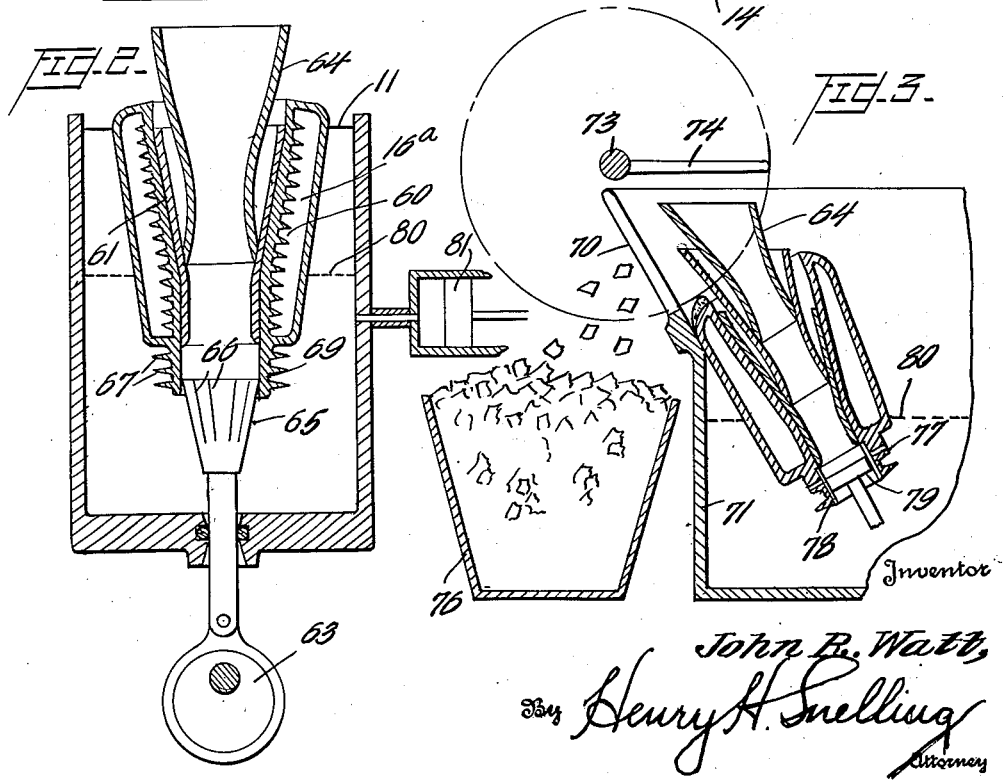
Inventor
John R. Watt,
By Henry H. Snelling
Attorney Patented Oct. 16, 1951

2,571,506

UNITED STATES PATENT OFFICE 2,571,506

INCREMENTAL FREEZING

John R. Watt, Austin, Tex.

Application March 22, 1946, Serial No. 656,265

13 Claims. (Cl. 62—106)

This invention relates to a method and apparatus for congealing liquids of all kinds, including the making of ice, wax candles, plastics, and the formation of continuous bars of cast metal. It has for one main object the provision of a machine for making ice at a more rapid rate than other similar machines.

A second object of the invention is to form a continuous column of ice or other solidified material which is of greater strength than a column would be if made by freezing increments in a conical shaped former. This object is obtained primarily by curving the inner walls of the freezing well, either in whole or in part only, especially at the delivery end of the form or well.

A further object of the invention is to provide a method of making ice which is suitable, by varying the speed of the plunger which moves the last formed increment, so that the machine can make flaked ice, a column having a core, a solid column, or a cracked column producing ice that is admirably adapted to be crushed for table use or for use in cafeterias, soda fountains, etc.

A further object of the device is to provide a method and apparatus for making ice or other congealed material by incremental shells in which the column is elevated from the freezing cell to the air where it may topple of its own weight or be cut into sections by saws, or if of ice, by heated wires, or any other well known method of making a column of ice into briquettes.

Other objects of the invention will be seen from the following description and as particularly pointed out in the claims.

In the drawings:

Figure 1 is a sectional view of my device in its preferred form.

Figure 2 shows a modification adapted for producing flake ice.

Figure 3 shows a further modification.

In the preferred form shown in Figure 1, the numeral 10 represents a tank in which the water level is maintained at approximately the line 11 by a float 12 of well known type which controls the admission of water preferably near the bottom of the tank, as for example, at the point 14.

Near one side of the tank I mount one or more freezing cells 15, each having a hollow space 16 for the refrigerant. This space is bounded by an outer wall 17 and an inner wall 18, the latter having a central freezing surface and an inner corrugated surface 19, the latter so formed as better to convey heat between the space 16 and the freezing surface, the major portion of which is denoted by the numeral 20. Any means may be provided for introducing a refrigerant to the spaces 16, and any well known refrigerant medium can be used. In the type of freezing device illustrated, I have used dichlorodifluoromethane, introducing this at 22 and removing it at 23 near the top of the space 16.

Above the cell I mount an insulating pad 26 and above this I provide a trough 27 opening freely into the freezing cell's central chamber, so that water, held at a chosen level in the trough 27, as by any well known devices similar to the float 12 is admitted to the internal well of the cell so that the water runs down to the inclined smooth freezing surface 20. It is my preference that the insulating sheet shall touch the ice column as this insures a smooth surface of the ice, preventing a partial freezing up of the passage 28 which would leave a roughened surface of the emerging column of ice.

Water can be introduced into the trough in any desired manner, as for example by the pipe 30, and pump 31, the latter being operated by the float or other water level holding device. This pipe and pump may readily be eliminated by merely lowering the freezing unit in the tank the distance between the water level 11 and the water level in trough 27. The freezing cell has a lower extension which may optionally be integral as illustrated, having a cylindrical portion 33 separated from the rest of the cell by a groove 34 in order to minimize heat transfer. The cylindrical portion varies greatly in length with the different machines and may naturally be of separate material, well insulated from the cell. In Figure 1 this cylinder is smooth on the outside but may be finned as in Figure 2 as this increases the area in contact with the water, hence further restraining the creeping down of the freezing zone. The ram or plunger in all forms preferably has but a narrow area of contact with the cylinder and in Figure 1 as well as in the other types the lower contact edge of the ram is made as capable of shearing ice out of its return path as the upper side is on the forward or lifting stroke of the plunger.

Referring to Figure 1, particularly, a plunger 35 reciprocates within the cylinder 33 and may be driven in any desired manner by any combination of mechanical movements. In the particular type illustrated as I have constructed it the mechanism includes a simple form of double cam. The two cams are mounted side by side on driven shaft 36, cam 38 giving the plunger 35 a quick upward movement and cam 37 giving a still quicker lowering movement, these cams engaging the rollers 40 and 39 respectively on the clevis 41 the shaft of which is pivoted as at 42 between the ends of one arm of a simple rocker pivoted as at 43 and carrying at the far end, about a pivot pin 44, a relatively short connecting rod 45, which preferably should be of brass or similar material for carrying heat quickly. The two side plates of the clevis or cage are slotted as at 41a to clear the shaft 36.

The plunger 35 may have holes 46 in it or the threaded neck 47 of the connecting rod may be hollow as indicated so that water may enter from the tank as at 48 and be discharged as at 49 above the plunger. Either or both of these or any other means for admitting water from the tank to cylinder 33 may be used and preferably the plunger is proximate the inlet 14 in order to minimize or entirely avoid any freezing up of the holes 46 or the hollow core in the connecting rod or other admission means, as in Figure 2, for example. While vertical grooves in the cylinder, or horizontal holes therein would do, the passageways illustrated seem to give better results. The plunger 35 is of course a ram and while it fits the cylinder snugly it may operate at almost any speed desired, varying materially the product as will be later described.

Whatever the configuration of the plunger or ram, I have found it extremely wise to provide that the plunger shall be no colder than the water in the tank, the water being warmest at the inlet 14 and coldest where it touches the outer surface of the wall 17 of the freezing unit. The object of insuring against possible freezing of water in the passages which admit water from the tank to the cylindder, is best achieved by arranging so that the arm shall be close to, and preferably immediately above, the inlet 14.

In the present form for freezing solid ice as so far described, the shaft 36 is driven at such a speed as to give from 300 to 500 cycles per hour and the stroke of the plunger, which can readily be adjusted, seems to give best results when the stroke is $\frac{5}{16}$ of an inch and the relative positioning is such that the plunger travels entirely within the cylindrical portion 33, that is, I much prefer that the top of the plunger stroke shall not extend into the flared portion.

The shape of the inner surface of the freezing unit is apparently of considerable importance. The major portion of the surface 20 I slope at an angle of about 26°. In the machine as now made this porton is conical but obviously the horizontal cross section could be that of a rounded square or any other form desired and the entire surface may be curved in a vertical cross section. The sloping portion 20 merges by a smooth curve 50 with the cylindrical portion in which the plunger travels and the major portion 20, whether conical or curved, merges smoothly with an upper tapered portion 53, which above the point of juncture has a total included angle of about 10°. When this angle is lowered to near zero, that is, in line with the margin 55 of the ice column 56, there is a strong tendency to block the flow of water down to the surface 20 hence I prefer the angle at each side to be at least 2½° and up to perhaps 7½°.

In my early experimental work I had a moderately sharp cusp between the tapered surface 20 and the cylinder surface at the bottom and no zone of lessened taper 53 at the top of the sloping portion. The strength of the column under those circumstances was very much less than the strength of the column which I produce with the machine as illustrated in which the central cone merges smoothly into the other contours both at the top and at the bottom of the freezing surface 20.

The outer surface of the ice is also very much improved. Whereas without these improvements it was scaly and porous; with them it it as hard, homogeneous, and smooth as that of ice made by any other process.

The baffle 57 is optional but is preferable to form an inner wall in part of the trough 27 as otherwise the water entering the trough 27 would melt the surface of the ice column 56 to too great an extent. This baffle does not extend all the way around the reservoir and has its principal use at starting, as later on the water in the system becomes so cold the baffle is scarcely needed. Using the refrigerant named, and having a suction approximately atmospheric, the freezing surface 20 is held at a temperature of about −20° F. The ram stroke is a bit greater than ¼" and in a revolution of the shaft 36 the plunger 35 remains at its lowest point for three-quarters of a revolution and the return or lowering stroke of the plunger takes approximately half the time of the elevating stroke. With the $\frac{5}{16}$" stroke I prefer, it is possible to use a simple eccentric as in Figure 2 but there is a greater power consumption for the ice sometimes readheres to the cylinder walls as it is pushed upward, hence the quick return is better and gives smoother operation especially with a longer stroke. A positive powered return stroke seems highly desirable as we must insure against even a short halting of the ram in the freezing zone (with a spring return for example) as the plunger would be immobilized in just a moment or so of lack of movement.

The operation of the preferred form for freezing solid ice, is as follows:

The plunger 35 moves upwardly and crushes the sharp peripheral surface of the ice column, forming pack ice which is driven into the center of the ice column already formed about it and therefore fills what would otherwise be a small core or void. Expressed differently, if the machine is run slowly, there will be a central hole throughout the entire column of ice but if the speed is increased as I prefer it to be, the center hole is filled with the pack ice crushed from the bottom of the cylinder and scraped from the cylinder walls before a firm contact is had between the ram and the solid column proper. This ice completely closes the central hole and freezes hard. The further movement of the plunger now lifts the entire column about ⅛" and consequently leaves a space between the ice column and the freezing wall 20. The column remains in its elevated position and the plunger descends. Water from the tank 27 flows downwardly by gravity and by suction and fills this space from the top and at the same time the suction draws water upwardly through the holes 46, or other means, to around the bottom of the ice column and above the plunger. The dwell which can be as little as six seconds is sufficiently great to freeze the shell of water on surface 20 into ice which fuses or bonds to the previously formed column. Each successive shell has a thickness of anywhere from $\frac{1}{64}$ to $\frac{1}{32}$ of an inch and can be varied between reasonable limits on both sides of these figures.

Not as a limitation, but rather as an explanation of my process, the ice column 56 as now made is circular in cross section but may be square or other shape. It is roughly 3½" in diameter and the column moves upwardly almost ½" a minute from the forty-three square inches of freezing surface in the illustrated machine. This is a yield of about 25 pounds of ice per hour for each square foot of freezing surface. The extruded column is preferably severed into briquettes and these can be delivered by gravity down chutes into bunkers or other receptacles.

A still greater production of broken, bulk ice may be had by increasing the speed and the stroke of the plunger movement in the preferred form for solid ice. When started rapidly, the ice column has long longitudinal cracks and the center is unfrozen to a great degree. When used in this manner the ice column is extruded as long jagged fragments, probably an inch thick, which makes it well suited to use with a crusher to provide ice of the type used in iced drinks, ice beds, such as are familiar in cafeteria service, and in any other place where crushed ice is desired. The advantage of this method is that I have produced more than 100 pounds of ice per hour for each square foot of freezing surface.

In Figure 2 I have shown one of the many modifications of my preferred apparatus. This one makes flake-ice about $\frac{1}{16}$" thick. In this case the refrigerant space 16a is bounded by an inner wall having small annular fins 60. The internal surface 61 of the freezing cell is sloped at a total included angle of 12° or less, and the stroke of the plunger 35a is greatly increased, preferably to about 2½". Any mechanism may advance the plunger and in this figure I have shown an eccentric 63. In this form I have achieved more than 50 pounds of ice produced per square foot of freezing surface per hour. This is not solid, but the sheets of ice are lifted intact and do not bond together. This particular device is convenient for the production of flake ice as the shells are quite thin and the output is about four times greater than is produced on commercial flake ice machines with which I am familiar.

The piston 65 serves the same purpose as ram 35 but is quite different in shape, being generally conical and slotted as at 66 to permit the passage of water and give a spring effect whereby the plunger or ram may ride over the ice on the return or lowering stroke. The fins 67 increase the surface exposed to the outside water and hence keep the lower part of the cylinder 69 (corresponding to 33 in Figure 1) relatively warm and consequently unfrozen in order to provide an appreciable gap between the top of the ram 65 at its lowest point and the bottom of the last formed ice shell 64. In this machine all of the water enters from the bottom, none being added at the upper end of the freezing cell.

The machine of Figure 3 is quite similar to that of Figure 2 except that the centerline of the freezing unit is at an angle, in line with the stainless steel sloping fingers 70 extending from the tank wall 71. Shaft 73, carries arms 74 which pass between the fingers 70 and while crushing the ice shells 64 into flakes, pass these flakes into hopper 76.

The cylinder is a bit modified, having side holes 77 for passage of water and also longitudinal slots 78 for the same purpose. Either of these methods of passing water to the space above the ram 79 may be used alone.

In order to facilitate the ease of handling the ice flakes I supercool the shells to avoid all freezing together of the ice pieces as might occur should their temperature rise to 32° F. At low temperatures the ice flakes are entirely separate, just as perfectly dry snow flakes. Perhaps the simplest manner of achieving this object is to withdraw the water a few seconds before the upward or discharging stroke of the ram as then the shell will be adequately supercooled. The water level is lowered from the usual 11 to a point such as 80 by any convenient means, such as a bellows or a displacement piston 81 or other well-known mechanism suitably connected to the operating linkage.

What I claim is:

1. In a device for freezing a fluid material, a hollow cell having a flaring inner surface, merging at its smaller end into a form in which the surface is parallel to a central axis, a plunger having its peripheral forward rim snugly engaging the inner face of smaller portion, means for reciprocating the plunger in said smaller portion, means for feeding the fluid to the smaller portion between the plunger and the flaring inner surface while the plunger is in contact with the smaller portion, and means for intermittently operating the plunger reciproating means to advance a shell of congealed material frozen in the cell and to provide a space into which the fluid may pass between the formed shell and the refrigerating surface when moving in one direction and to return the plunger to initial position when moving in the opposite direction, the rate of travel of the plunger being such that there will be a plurality of cycles per minute, said plunger being substantially conical and being divided by a plurality of slots to form resilient members, whereby the plunger may ride over any congealed portions on its return stroke.

2. In a device of the class described, a tank, means for admitting water into the tank at a point near the bottom of the tank, means for holding the water level in the tank at a constant elevation, a refrigerating cell extending into the tank at a point adjacent the water inlet, said cell being of hollow construction having a smooth curved taper internally increasing in size from the bottom to the top and becoming nearly parallel at the top, a corrugated surface adjacent the freezing surface of the cell and forming a portion of the wall to contain the refrigerant, a cylindrical extension immediately below the freezing cell and separated in part from the cell to decrease transfer of heat, a plunger in the cylindrical portion, a connecting rod adjustably secured to the plunger, a rocker arm pivoted to the connecting rod at one end and having the other end operated by a quick return mechanism, providing a long dwell between the advancing strokes of the piston, a reservoir for water above the cell and in communication with the freezing wall of the cell when a hollow formed shell of ice formed in the cell is advanced by the plunger.

3. The device of claim 2 in which a mid-portion of the freezing surface of the cell is tapered and has at top and bottom curves tangent to said tapered mid-portion whereby to strengthen the ice on the surface of the column.

4. The device of claim 2 in which the plunger has a stroke between $\frac{1}{16}$ and $\frac{3}{16}$ of an inch, the shell of ice formed in a single cycle varies from $1/64$ to $\frac{1}{16}$ of an inch in thickness, the plunger moves between 300 and 500 times per hour, moving forwardly for about 60° of a cam revolution returning in about 30° and dwelling at the lower point of its stroke for the remaining 270°.

5. The device of claim 2 having means for passing water from the tank to the cell above the plunger.

6. The method of making a continuous column of ice which consists in filling with water a freezing cell having divergent walls at an angle of slope roughly 20°, holding the water in the cell until a shell is frozen and then pushing the so-formed shell of ice partly out of the cell, forming a second shell without bonding same to the previously formed shell and continuing the process to form flake ice of a thickness of not greater than ¼".

7. The method of making ice flakes which consists in freezing a shell of ice on a submerged freezing surface, then exposing the formed shell to the same degree of temperature while out of contact with water and finally separating the supercooled shell from the freezing surface, whereby the shells will have less tendency to fuse together as they are moved from the freezing surface.

8. In an ice making machine, a freezing cell having a central flaring portion, and an ice-core engaging portion serving as a guide to keep the ice-core centered in the central flaring portion, a refrigerating chamber surrounding the central flaring portion, a water reservoir surrounding the refrigerating chamber, a water receptacle serving as a holding basin surrounding the ice-core as it emerges from the ice-core guiding portion, and heat insulating means between the water receptacle and the wall of the refrigerating chamber, to prevent freezing of the water in the holding basin.

9. The device of claim 8 with means for passing water from the reservoir chilled by the refrigerating chamber wall to the receptacle.

10. In an ice making machine, a freezing cell flaring upwardly from its smaller end, a lower extension projecting downwardly from the cell to form a ram chamber, a ram reciprocating in said chamber and snugly engaging its inner surface to scrape therefrom ice forming thereon and to pack same against the lower portion of the ice-core in the cell and to move the ice-core upwardly in the cell to leave an annular space between the core and the cell, guiding means for supporting the upwardly projecting ice-core above the flaring portion of the cell to center the ice-core so that said annular space will be evenly spaced completely around the ice-core, and means for delivering water to said space, the strokes of the ram for advancing the ice-core being spaced apart so that the ram pushes the ice-core thru the guiding means and out of contact with the flaring portion of the cell as soon as the fresh water has frozen between the ice-core and the cell.

11. The device of claim 10 including a passageway thru which additional water is admitted to the ram chamber, and thru which the air trapped in the ram chamber is discharged.

12. The device of claim 10 in which the flaring portion of the cell is surrounded by a freezing chamber, the ram chamber joins the freezing chamber and projects into the water in the pre-cooling tank formed by the reservoir, whereby the liquid in the reservoir is in contact with the outside surface of the ram chamber to minimize transfer of freezing temperature from the freezing chamber to the inner or ram engaging surface of the ram chamber.

13. An ice making machine of the type in which a ram operates in a ram chamber to pack ice freezing in said chamber against a previously formed ice-core and simultaneously advances the ice-core in a flaring freezing cell to form an annular space to receive a thin layer of water to be frozen to the ice-core; characterized by the provision of a passageway thru the ram, said passageway being axial from the ram surface engaging the ice and then being directed away from the axis to a point outside of the ram chamber.

JOHN R. WATT.

REFERENCES CITED

The following references are of record in the file of this patent:

UNITED STATES PATENTS

| Number | Name | Date |
|---|---|---|
| 191,256 | Riker | May 29, 1877 |
| 763,090 | Crane | June 21, 1904 |
| 1,478,863 | Stewart | Dec. 25, 1923 |
| 1,480,382 | Field | Jan. 8, 1924 |
| 1,866,509 | De Vout et al. | July 5, 1932 |
| 2,071,465 | Huber | Feb. 23, 1937 |

FOREIGN PATENTS

| Number | Country | Date |
|---|---|---|
| 569,071 | Germany | Jan. 30, 1933 |